United States Patent
Choi et al.

(10) Patent No.: US 12,265,814 B2
(45) Date of Patent: Apr. 1, 2025

(54) VEHICLE AND NETWORK SYSTEM

(71) Applicants: HYUNDAI MOTOR COMPANY, Seoul (KR); KIA CORPORATION, Seoul (KR); HYUNDAI AUTOEVER CORP., Seoul (KR)

(72) Inventors: Sungwoo Choi, Seoul (KR); Seung Hwan Shin, Seoul (KR)

(73) Assignees: HYUNDAI MOTOR COMPANY, Seoul (KR); KIA CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 197 days.

(21) Appl. No.: 17/506,427

(22) Filed: Oct. 20, 2021

(65) Prior Publication Data

US 2022/0206781 A1   Jun. 30, 2022

(30) Foreign Application Priority Data

Dec. 29, 2020   (KR) ........................ 10-2020-0185904

(51) Int. Cl.
G06F 8/65     (2018.01)
B60W 50/06    (2006.01)
G06F 9/48     (2006.01)
H04W 4/40     (2018.01)

(52) U.S. Cl.
CPC .............. *G06F 8/65* (2013.01); *B60W 50/06* (2013.01); *G06F 9/4881* (2013.01); *H04W 4/40* (2018.02); *B60W 2556/45* (2020.02)

(58) Field of Classification Search
CPC ........................................................ G06F 8/65
See application file for complete search history.

(56) References Cited

U.S. PATENT DOCUMENTS

| | | | |
|---|---|---|---|
| 10,791,494 B2 | 9/2020 | Lee et al. | |
| 2004/0102228 A1* | 5/2004 | Hakamata | H04W 52/0261 455/572 |
| 2014/0187190 A1* | 7/2014 | Schuler | H04W 12/084 455/404.1 |
| 2016/0352817 A1* | 12/2016 | Burba | H04L 67/104 |
| 2017/0004365 A1* | 1/2017 | Ono | G06V 20/588 |

(Continued)

FOREIGN PATENT DOCUMENTS

KR   20200032541 A   3/2020

*Primary Examiner* — Jae U Jeon
(74) *Attorney, Agent, or Firm* — Lempia Summerfield Katz LLC

(57) ABSTRACT

A vehicle and a network system are capable of downloading and updating the latest software from a plurality of other vehicles that are not subject to distance restrictions during an update time in a parking or autonomous driving situation. The vehicle includes a controller and a communicator, which is configured to perform communication with a server and a plurality of other vehicles in a network. Based on a software update request of the vehicle, the controller is configured to perform a software update of the vehicle through the other vehicle in response to a determination that the number of the other vehicle having a processor corresponding to a processor included in the vehicle among the plurality of other vehicles and the other vehicle for which the software update included in a wireless network formed by the vehicle is completed is greater than a predetermined reference value.

7 Claims, 6 Drawing Sheets

| PRIORITY | VEHICLE NUMBER | DOWNLOAD CAPACITY CALCULATION | DOWNLOAD TIME REQUIRED |
|---|---|---|---|
| 1 | SECOND OTHER VEHICLE (AUTONOMOUS DRIVING) | $\dfrac{2GB \times 1}{1 + 3} = 0.5G$ | 500 seconds |
| 2 | FIRST OTHER VEHICLE (AUTONOMOUS DRIVING) | $\dfrac{2GB \times 3}{1 + 3} = 1.5G$ | 500 seconds |
| 3 | THIRD OTHER VEHICLE (AUTONOMOUS DRIVING) | 0.54G | 270 seconds |
| DROP OUT | FOURTH OTHER VEHICLE (AUTONOMOUS DRIVING) | | |

(56) References Cited

U.S. PATENT DOCUMENTS

| | | |
|---|---|---|
| 2018/0203451 A1* | 7/2018 | Cronin ............... B60W 60/0011 |
| 2019/0137287 A1* | 5/2019 | Pazhayampallil ..... G01C 21/34 |
| 2020/0092789 A1 | 3/2020 | Lee et al. |
| 2020/0128066 A1* | 4/2020 | Sugimoto ............... H04L 67/12 |
| 2020/0371773 A1* | 11/2020 | Kato .................. G01C 21/3885 |
| 2021/0083950 A1* | 3/2021 | Bentley ................... H04L 67/34 |
| 2021/0224056 A1* | 7/2021 | John ....................... H04W 4/46 |
| 2021/0319332 A1* | 10/2021 | Isaac .................... B60W 40/09 |

\* cited by examiner

FIG. 3

| PRIORITY | VEHICLE NUMBER | REMAINING DRIVING TIME | TRANSMISSION SPEED |
|---|---|---|---|
| 1 | SECOND OTHER VEHICLE (AUTONOMOUS DRIVING) | 10 MINUTES | 1Mb/s |
| 2 | FIRST OTHER VEHICLE (AUTONOMOUS DRIVING) | 5 MINUTES | 3Mb/s |
| 3 | THIRD OTHER VEHICLE (AUTONOMOUS DRIVING) | 10 MINUTES (OBTAIN INFORMATION WHEN SETTING NAVIGATION DESTINATION) | 2Mb/s |
| DROP OUT | FOURTH OTHER VEHICLE (AUTONOMOUS DRIVING) | 15 MINUTES | 0.5Mb/s |

FIG. 4

| PRIORITY | VEHICLE NUMBER | DOWNLOAD CAPACITY CALCULATION | DOWNLOAD TIME REQUIRED |
|---|---|---|---|
| 1 | SECOND OTHER VEHICLE (AUTONOMOUS DRIVING) | $\dfrac{2GB \times 1}{1+3} = 0.5G$ | 500 seconds |
| 2 | FIRST OTHER VEHICLE (AUTONOMOUS DRIVING) | $\dfrac{2GB \times 3}{1+3} = 1.5G$ | 500 seconds |
| 3 | THIRD OTHER VEHICLE (AUTONOMOUS DRIVING) | 0.54G | 270 seconds |
| DROP OUT | FOURTH OTHER VEHICLE (AUTONOMOUS DRIVING) | | |

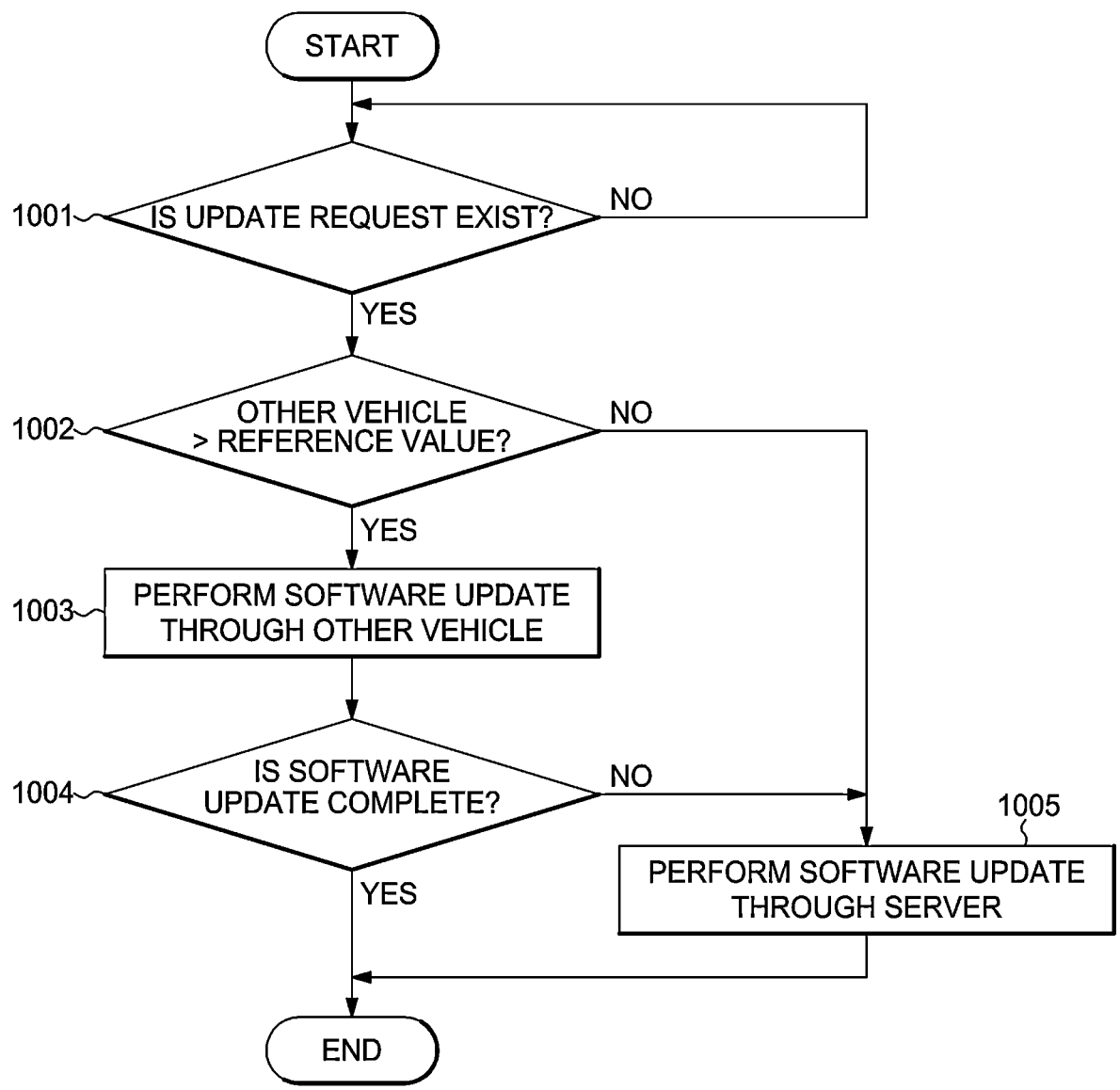

VEHICLE AND NETWORK SYSTEM

CROSS-REFERENCE TO RELATED APPLICATION(S)

This application is based on and claims priority under 35 U.S.C. § 119 to Korean Patent Application No. 10-2020-0185904, filed on Dec. 29, 2020, the disclosure of which is incorporated herein by reference.

BACKGROUND

1. Field

The disclosure relates to a vehicle and a network system for updating a software based on communication with an over the air (OTA) server.

2. Description of Related Art

A number of electronic control units (ECUs) in vehicles is increasing. As a structure and a function of the ECU become more complex, a software module inside the ECU also needs to be updated for reasons such as bug fixes, performance improvement, and security improvement.

As discussed above, such software needs to be updated to add new functions and improve errors.

In recent years, an over the air (OTA) service for updating software over the air has begun to be provided, which enables cost-effective software updates to be performed safely and quickly, and software recalls and related costs can be reduced.

An existing method updates the software of the vehicle in a many-to-one manner using one-to-one communication between an OTA server and the vehicle or a local network with a short-distance vehicle. The existing method has a problem in that it can be updated only with limited resources in the local network.

SUMMARY

An aspect of the disclosure is to provide a vehicle and a network system capable of downloading and updating the latest software from a plurality of other vehicles that are not subject to distance restrictions during an update time in a parking or autonomous driving situation.

Additional aspects of the disclosure are set forth in part in the description which follows and, in part, should be apparent from the description or may be learned by practice of the disclosure.

According to an aspect of the disclosure, a vehicle includes a controller and a communicator. The communicator is configured to perform communication with a server and a plurality of other vehicles in a network. Based on a software update request of the vehicle, the controller is configured to perform a software update of the vehicle through the other vehicle in response to a determination that the number of the other vehicle having a processor corresponding to a processor included in the vehicle among the plurality of other vehicles and the other vehicle for which the software update included in a wireless network formed by the vehicle is completed is greater than a predetermined reference value.

The controller may be configured to give a priority to each of the plurality of other vehicles based on a data transmission speed corresponding to the plurality of other vehicles included in the wireless network and to perform the software update of the vehicle based on the priority.

The controller may be configured to determine a remaining driving time of each of the plurality of other vehicles included in the wireless network, to give a priority to each of the plurality of other vehicles based on the remaining driving time corresponding to each of the other vehicles, and to perform the software update of the vehicle based on the priority.

The controller may be configured to give a high priority to the other vehicle performing autonomous driving among the plurality of other vehicles included in the wireless network, and to perform the software update of the vehicle based on the priority.

The controller may be configured to determine an amount of data to be received from each of the plurality of other vehicles based on a remaining driving time and a data transmission speed corresponding to each of the plurality of other vehicles included in the wireless network.

Based on the software update from the plurality of other vehicles included in the wireless network being not performed, the controller may be configured to receive data from the server to perform the software update.

Based on the determination that the number of the other vehicles included in the wireless network is less than or equal to the predetermined reference value, the controller may be configured to receive data from the server to perform the software update.

Based on the software update from the other vehicles included in the wireless network being not completed, the controller may be configured to receive remaining data from the server to perform the software update.

According to another aspect of the disclosure, a vehicle network system includes, a vehicle, a plurality of other vehicles, and a server. The server is configured to form a wireless network with the other vehicle having a processor corresponding to a processor included in the vehicle among the plurality of other vehicles and the vehicle. Based on a software update request of the vehicle, the vehicle may be configured to perform a software update of the vehicle through the other vehicle in response to a determination that the number of the other vehicles included in the wireless network being greater than a predetermined reference value.

BRIEF DESCRIPTION OF THE DRAWINGS

These and/or other aspects of the disclosure should become apparent and more readily appreciated from the following description of the embodiments, taken in conjunction with the accompanying drawings of which:

FIGS. 3 and 4 are views for describing an operation of determining a priority according to an embodiment.

FIG. 6 is a flowchart according to an embodiment.

DETAILED DESCRIPTION

Figure 1:
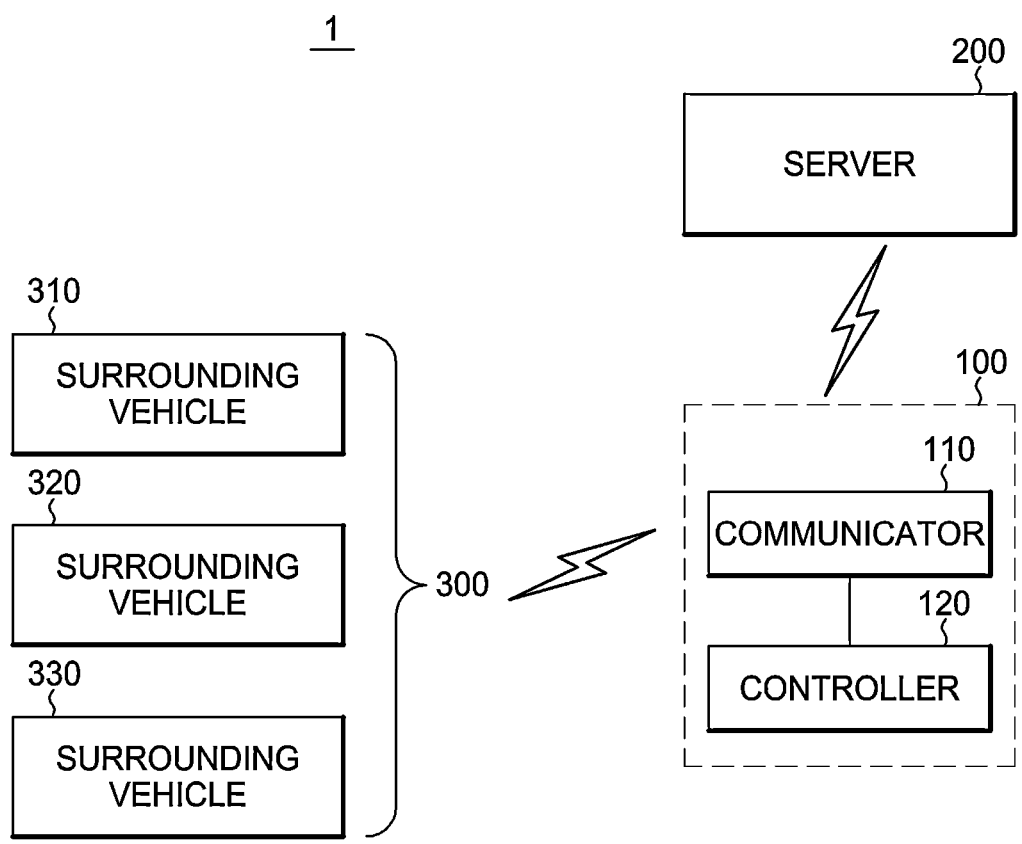
FIG. 1 is a control block diagram of a vehicle and a network system according to an embodiment.

Like reference numerals refer to like elements throughout the specification. Not all elements of the embodiments of the disclosure are described, and the description of what are commonly known in the art or what overlap each other in the embodiments has been omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It should be further understood that the term "connect" and its derivatives refer both to direct and indirect connection. The indirect connection includes a connection over a wireless communication network.

The terms "include (or including)" and "comprise (or comprising)" are inclusive or open-ended and do not exclude additional, unrecited elements or method steps, unless otherwise mentioned.

Further, when it is stated that a layer is "on" another layer or substrate, the layer may be directly on another layer or substrate or a third layer may be disposed therebetween.

It should be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another region, layer, or section.

It should be understood that the singular forms "a," "an," and "the" include plural references unless the context clearly dictates otherwise.

Reference numerals used for method steps are merely used for convenience of explanation but not used to limit an order of the steps. Thus, unless the context clearly dictates otherwise, the written order may be practiced otherwise. When a component, device, element, or the like of the present disclosure is described as having a purpose or performing an operation, function, or the like, the component, device, or element should be considered herein as being "configured to" meet that purpose or to perform that operation or function.

Hereinafter, an operation principle and embodiments of the disclosure are described with reference to accompanying drawings.

FIG. 1 is a control block diagram of a vehicle and a network system according to an embodiment.

Referring to FIG. 1, a vehicle 100 may include a communicator 110 and a controller 120.

The communicator 110 may communicate with a server 200 and a plurality of other vehicles 300.

The communicator 110 may include one or more components that enable communication with an external device and may include, for example, at least one of a short-range communication module, a wired communication module, or a wireless communication module.

When there is a software update request of the vehicle 100, the controller 120 may perform a software update of the vehicle 100 through other vehicles 300 when the number of the other vehicles having a processor corresponding to a processor included in the vehicle 100 among the plurality of other vehicles 300 and the other vehicles for which the software update included in the wireless network formed with the vehicle is completed is greater than a predetermined reference value.

Meanwhile, the server 200 may form a network with other vehicles including the processor corresponding to the processor included in the vehicle 100 among the plurality of other vehicles 300.

Meanwhile, the server 200 may be provided as an over the air (OTA) server. In addition, the wireless network may be provided as a virtual local area network (LAN).

The virtual LAN may refer to a communication network (LAN) having virtually no restrictions on distances and positions, regardless of a physical network configuration. A device uses a LAN switch or an asynchronous transfer mode (ATM) switch to arbitrarily divide a range in which broadcast packets are transmitted regardless of physical wiring. Even if they are connected to different networks, terminals belonging to the virtual LAN may receive the same services as those connected to the same LAN.

The server 200 may set the same electronic control unit (ECU) information, i.e., vehicles having similar processor specifications, as one virtual network (VLAN, virtual LAN) environment, regardless of the distance or position, using ECU information of the vehicle 100.

On the other hand, if there is a new update for vehicles set to the same VLAN environment, the software update may be performed through communication between the server 200 and the vehicle 100.

In other words, through direct communication between the server 200 and the vehicle 100, the update may be performed directly until a certain number of vehicles is exceeded.

Meanwhile, when the number of other vehicles having the updated software is equal to or greater than a predetermined number, i.e., the reference value, the vehicle 100 may update the software through communication with the other vehicles 300.

The controller 120 may give a priority to each of the plurality of vehicles based on data transmission speeds corresponding to the plurality of other vehicles 300 included in the wireless network.

The controller 120 may perform the software update of the vehicle 100 based on the priority.

The vehicle 100 and the server 200 may create a list of surrounding vehicles that can be updated.

The controller 120 may exclude the other vehicles whose network communication quality with other vehicles is below a certain level from the list of the other vehicles 300 used in the software update.

The controller 120 may determine a remaining driving time of each of the plurality of other vehicles 300 included in the wireless network, give the priority to each of the plurality of other vehicles 300 based on the remaining driving time corresponding to each of the other vehicles, and perform the software update of the vehicle 100 based on the priority.

In other words, the controller 120 may receive data for a large amount of time for a vehicle with a large remaining driving time and may receive data by giving a high priority to the vehicle with the large remaining driving time.

The controller 120 may give a high priority to a vehicle that performs autonomous driving with a high reliability for the remaining driving time among a plurality of other vehicles 300 included in the wireless network and update the software of the vehicle 100 based on the priority.

In other words, the controller 120 may give the high priority to the vehicle 100 performing the autonomous driving and a low priority to the vehicle 100 performing a normal driving.

The controller 120 may determine an amount of data to be received from each of the plurality of other vehicles 300 based on the remaining driving time and data transmission speed corresponding to each of the plurality of other vehicles 300 included in the wireless network.

For example, when the data required for a total update is 1 GB, the other vehicle with a large remaining driving time and a high transmission speed may receive 700 MB of data and the other vehicle with a low remaining driving time and a low transmission speed may receive 300 MB of data.

When the software update is not performed from the plurality of other vehicles 300 included in the wireless network, the controller 120 may receive data from the server 200 and perform the software update.

When the number of the other vehicles included in the wireless network is less than or equal to the predetermined reference value, the controller 120 may receive data from the server 200 and perform the software update. In other words, when the wireless network consisting of a sufficient number of other vehicles is not formed for the software update, the controller 120 may directly receive data from the server 200 and perform the software update.

The controller 120 may include a memory that stores data for an algorithm or a program that reproduces the algorithm for controlling the operation of components in the vehicle 100 and a processor that performs the above-described operation using the data stored in the memory. In this case, the memory and the processor may be implemented as separate chips. Alternatively, the memory and the processor may be implemented as a single chip.

At least one component may be added or deleted according to the performance of the components of the vehicle 100 illustrated in FIG. 1. In addition, it should be readily understood by those of ordinary skill in the art that the mutual positions of the components may be changed corresponding to the performance or structure of the system.

Meanwhile, each component illustrated in FIG. 1 may refer to software and/or hardware components such as Field Programmable Gate Array (FPGA) and Application Specific Integrated Circuit (ASIC).

Figure 2:
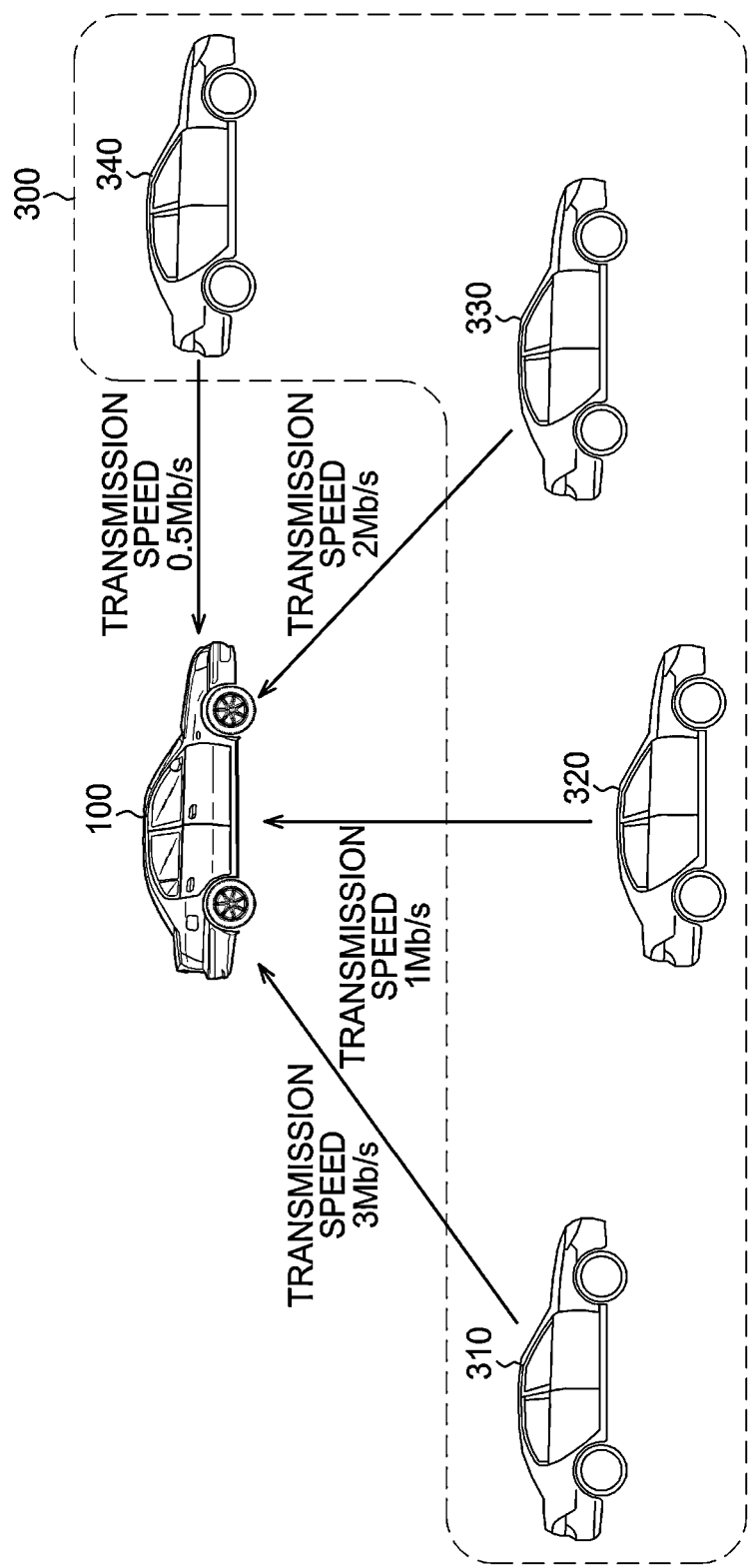
FIG. 2 is a view for describing an operation in which a vehicle and another vehicle form a network according to an embodiment.

FIG. 2 is a view for describing an operation in which a vehicle and another vehicle form a network according to an embodiment. FIGS. 3 and 4 are views for describing an operation of determining a priority according to an embodiment.

Referring to FIGS. 2 and 3, the other vehicles 310, 320, 330, and 340 forming the wireless network may communicate with the vehicle 100.

Meanwhile, in FIG. 2, the first, second, and fourth other vehicles 310, 320, and 340 are vehicles performing the autonomous driving, and the third other vehicle 330 is a general vehicle that does not perform the autonomous driving. The controller 120 of the vehicle 100 may create an update list with priority on autonomous driving vehicles. In a case of general driving vehicles, when a navigation destination is set, the controller 120 may form into the list of other vehicles in consideration of the remaining driving time.

Particularly, the fourth other vehicle 340 may be given the lowest priority since a transmission speed is only 0.5 Mb/s. The data transmission speed like the fourth other vehicle may be excluded from the vehicle 100 receiving the software data because it is not suitable for the software update of the vehicle 100.

Meanwhile, in a case of the third other vehicle 330, the remaining driving time may be 10 minutes and the transmission speed may be provided at 2 Mb/s.

When the controller 120 determines the remaining driving time of other vehicles, navigation destination setting information may be obtained and used.

Meanwhile, in the case of the third other vehicle 330, although the transmission speed is higher than that of the second other vehicle 320, since the third other vehicle itself is not the autonomous driving vehicle, it may be given a lower priority.

In a case of the first other vehicle 310, the transmission speed is 3 Mb/s and has the largest data transmission speed among other vehicles illustrated in FIG. 2. However, the remaining driving time is only 5 minutes, so that a second priority may be given.

Meanwhile, the second other vehicle 320 may have a transmission speed of 1 Mb/s but have the longest remaining driving time and thus be given the highest priority.

Meanwhile, the controller 120 of the vehicle 100 may perform the software update to the first and second of the other vehicles illustrated in FIG. 2 and determine that the third other vehicle 330 is a spare vehicle.

Meanwhile, referring to FIGS. 2 and 4, an embodiment in which 2 GB is required for the software update of the vehicle 100 is described.

The vehicle 100 may determine data to be received from each other vehicle based on the other vehicle's data transmission speed and remaining driving time.

As illustrated in FIG. 3, the software is basically updated to the first and second surrounding vehicles 310 and 320, and the data required for software update may be distributed centering on the first and second other vehicles 310 and 320.

Particularly, the amount of software to be downloaded may be calculated for each surrounding vehicle in consideration of the transmission speed of the vehicle 100 in the update list.

The vehicle 100 may calculate by adding the transmission speed of each other vehicle, dividing the transmission speed of each other vehicle by the corresponding value, and multiplying the amount of software to be downloaded.

Meanwhile, a capacity of data received from each vehicle may be determined based on the following equation.

$$\frac{D_{full} \times V_{n1}}{V_{n1} + V_{n2}} = D_{n1} \qquad \text{[Equation 1]}$$

Referring to Equation 1, Dfull may refer to the capacity of all received data, Vn1 may refer to the data transmission speed of the corresponding other vehicle, and Vn2 may refer to the data transmission speed of another vehicle to which the data is not allocated among other vehicles. Dn1 may refer to the amount of data to be received distributed to a corresponding other vehicle.

The vehicle 100 may calculate a required time to download the calculated capacity. When the corresponding time exceeds the remaining driving time, the vehicle 100 may allocate by calculating an amount of time that is insufficient for the vehicle 100 listed in the spare vehicle, i.e., the third other vehicle 330.

Referring to FIG. 4, since the second other vehicle 320 has a transmission speed of 1 Mb/s, ¼ of a total capacity may be allocated in relation to the first other vehicle 310. Accordingly, the vehicle 100 may receive 500 MB of data, which is ¼ of 2 GB, from the second other vehicle 320.

Meanwhile, since the remaining driving time of the second other vehicle 320 is 10 minutes and the data transmission speed of the second other vehicle 320 is 1 Mb/s, it takes 500 seconds to receive all of data of 500 MB.

Accordingly, all corresponding data may be received while the second other vehicle 320 is driving.

In the case of the first surrounding vehicle 310, the data may be received at the transmission speed of 3 Mb/s and ¾ of the total capacity may be allocated in relation to the second other vehicle 320.

Accordingly, the vehicle 100 may receive data of 1500 MB, which is ¾ of 2 GB, from the first other vehicle 310.

Meanwhile, the remaining driving time of the first other vehicle 310 is 5 minutes, i.e., 300 seconds, the data transmission speed of the first other vehicle 310 is 3 Mb/s. Also, 500 seconds is consumed to receive all data of 1500 MB and thus, all the corresponding data may not be received while the first other vehicle 310 is driving.

In other words, the vehicle 100 may receive 1500 MB of data for 500 seconds from the first other vehicle 310.

The vehicle 100 may calculate a download time through other vehicles and compare the download time through communication with the server 200.

Meanwhile, in receiving the software update, if it takes more time to receive data from other vehicles 300 than to receive data from the server 200, the data may be downloaded through the server 200.

Meanwhile, the vehicle 100 may update an update vehicle list in consideration of a network speed and a communication state of each other vehicle for a certain time interval and may update the software by recalculating the update capacity based on the updated history.

In addition, when the vehicle 100 can no longer find another vehicle capable of updating the vehicle software, the vehicle 100 may connect to the server 200 for the remaining capacity and download the remaining data to the vehicle 100.

In addition, when the vehicle 100 cannot be updated with any other vehicle through communication on the virtual network even after a certain time has elapsed, by putting an ID of the vehicle 100 in a queue of the server 200, it waits until a network load of the OTA server reaches a certain level. When a first order in the queue is reached, the vehicle 100 may perform the update.

Meanwhile, the operations described with reference to FIGS. 2-4 are only an embodiment for describing the operation of the disclosure. There is no limitation on the operation of the vehicle 100 allocating the data to other vehicles 300 and receiving the data.

Figure 5:
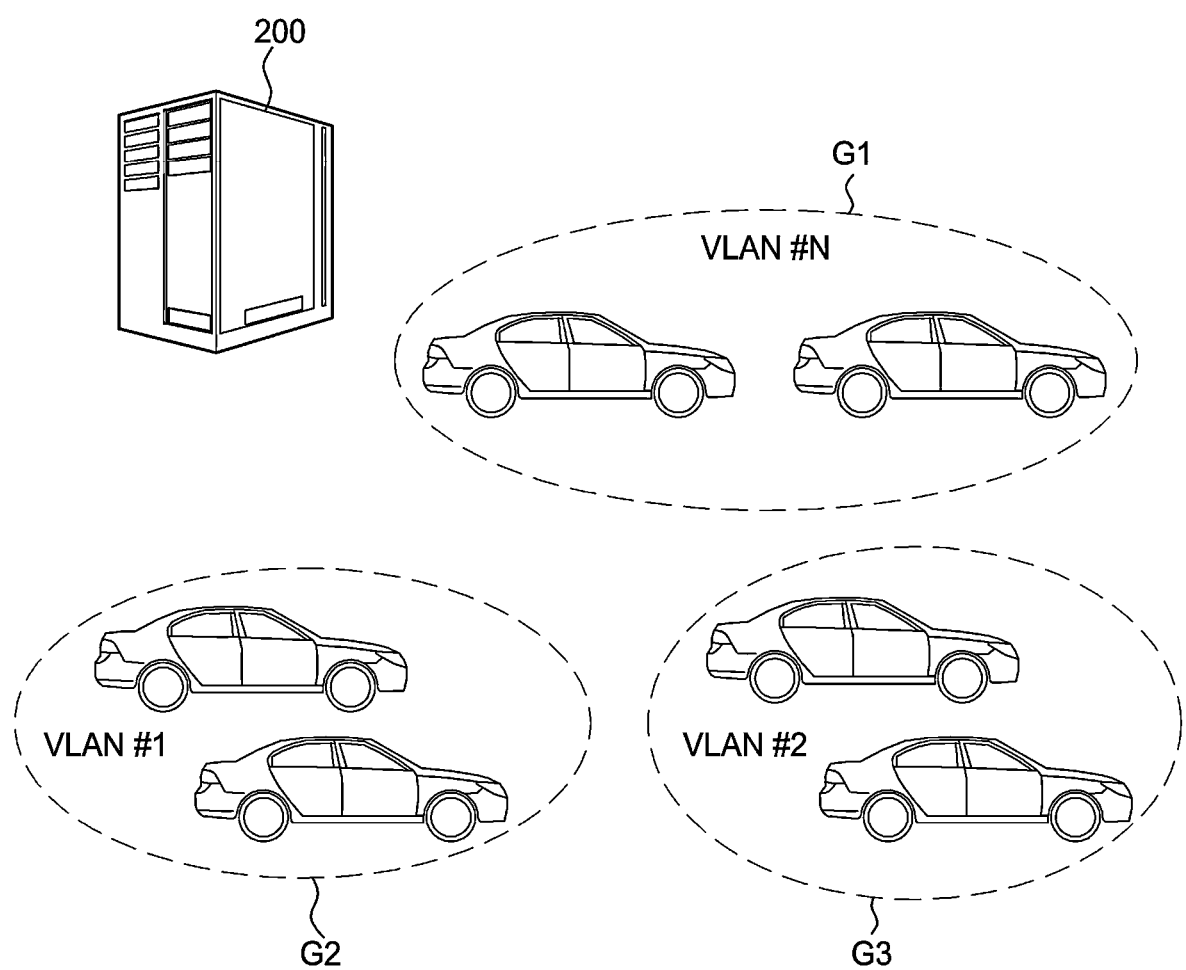
FIG. 5 is a view for describing an operation of forming a wireless network according to an embodiment.

FIG. 5 is a view for describing an operation of forming a wireless network according to an embodiment.

Referring to FIG. 5, the vehicle 100 communicating with the server 200 may each form the wireless network.

FIG. 5 illustrates three wireless networks G1, G2, and G3.

The server 200 may designate and manage VLANs for each vehicle and may also perform the update with the same software image in the same VLAN.

For example, the G1 wireless network may perform the software update based on communication with vehicles and the server included in the G1.

The server 200 may configure VLAN according to the ECU configuration of each vehicle.

According to the embodiment, in the case of vehicles constituting the wireless network of the G2, a total of 11 ECUs may be configured. The server may group the vehicles and manage them as one virtual network.

According to the embodiment, vehicles constituting the G3 wireless network may be configured with a total of six ECUs. The server may group the vehicles and manage them as one virtual network.

Meanwhile, when the vehicles access the server, the server may search for a hardware configuration of the vehicle and include the vehicle in the wireless network corresponding to the configuration.

FIG. 6 is a flowchart according to an embodiment.

Referring to FIG. 6, when the software update request of the vehicle 100 exists (Yes in 1001), when the number of updated vehicles included in the wireless network is greater than the reference value (Yes 1002), the vehicle 100 may perform the software update through other vehicles 300 (1003).

Meanwhile, when the vehicle 100 performs the software update through other vehicles 300, the data transmission speed of the other vehicles and the remaining driving time of the other vehicles may be considered as described above.

On the other hand, when the number of other vehicles 300 included in the wireless network is less than or equal to the reference value (No in 1002), the vehicle 100 may perform the software update through the server 200 (1005).

Meanwhile, the vehicle 100 may perform the software update again through the server 200 (1005) even when the software update is not completed using other vehicles 300 (No in 1004).

According to the embodiments of the disclosure, the vehicle and the network system may download and update the latest software from a plurality of other vehicles that are not subject to distance restrictions during an update time in a parking or autonomous driving situation.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have been described with reference to the accompanying drawings. It should be apparent to those of ordinary skill in the art that the disclosure may be practiced in other forms than the embodiments as described above without changing the technical idea or essential features of the disclosure. The above embodiments are only by way of example and should not be interpreted in a limited sense.

What is claimed is:

1. A vehicle comprising:
   a memory configured to store data; and
   a processor configured to:
   perform communication with a server and a plurality of other vehicles included in a wireless network;
   update a vehicle list based on a network speed of the wireless network and a communication of each of other vehicles among the plurality of other vehicles at a time interval while the plurality of other vehicles is driving, the vehicle list providing a software update for the vehicle;
   based on a software update request of the vehicle, an update capacity of data to be received from each of the other vehicles, a number of the other vehicles, each having a corresponding processor that corresponds to the processor included in the vehicle and having completed the software update executable by the corresponding processor, and the updated vehicle list, perform the software update executable by the processor of the vehicle by directly receiving the software update from the other vehicles among the plurality of other vehicles through the communication over the wireless network with the other vehicles, wherein the number of the other vehicles, each having the corresponding processor that corresponds to the processor included in the vehicle and having completed the software update executable by the corresponding processor, is greater than a predetermined reference value;

based on a number of the other vehicles, each having the corresponding processor that corresponds to the processor included in the vehicle and having completed the software update executable by the corresponding processor, perform the software update executable by the processor of the vehicle by directly receiving the software update from the server through the communication over the wireless network with the server, wherein the number of the other vehicles, each having the corresponding processor that corresponds to the processor included in the vehicle and having completed the software update executable by the corresponding processor, is less than or equal to the predetermined reference value;

perform the software update of the vehicle based on a priority while the plurality of other vehicles is driving;

control the vehicle based on the software update of the vehicle performed according to the priority given to each of the plurality of other vehicles based on the current remaining driving time corresponding to each of the other vehicles while the plurality of other vehicles is driving; and control the vehicle based on the software update of the vehicle performed according to a current remaining driving time of each of the plurality of other vehicles included in the wireless network while the plurality of other vehicles is driving.

2. The vehicle according to claim 1, wherein the processor is further configured to:

give the priority to each of the plurality of other vehicles based on a data transmission speed corresponding to the plurality of other vehicles included in the wireless network; and perform the software update of the vehicle based on the priority.

3. The vehicle according to claim 1, wherein the processor is further configured to:

give a high priority to the other vehicles performing autonomous driving among the plurality of other vehicles included in the wireless network; and perform the software update of the vehicle based on the priority.

4. The vehicle according to claim 1, wherein the processor is further configured to determine an amount of data to be received from each of the plurality of other vehicles based on the current remaining driving time and a data transmission speed corresponding to each of the plurality of other vehicles included in the wireless network.

5. The vehicle according to claim 1, wherein, based on the software update from the plurality of other vehicles included in the wireless network being not performed, the processor is further configured to receive data from the server to perform the software update.

6. The vehicle according to claim 1, wherein, based on the software update from the other vehicles included in the wireless network being not completed, the processor is further configured to receive remaining data from the server to perform the software update.

7. A vehicle network system comprising:

a vehicle;

a plurality of other vehicles; and a server configured to form a wireless network with the vehicle and other vehicles, among the plurality of other vehicles, the other vehicles each having a corresponding processor that corresponds to a processor included in the vehicle, wherein the vehicle is configured to update a vehicle list based on a network speed of the wireless network and a communication of each of the other vehicles at a time interval while the plurality of other vehicles is driving, the vehicle list providing a software update for the vehicle;

based on a software update request of the vehicle, an update capacity of data to be received from each of the other vehicles, a number of the other vehicles, each having completed the software update executable by the corresponding processor, and the updated vehicle list, perform the software update executable by the processor of the vehicle by directly receiving the software update from the other vehicles among the plurality of other vehicles through communication over the wireless network with the other vehicles, wherein the number of the other vehicles, each having completed the software update executable by the corresponding processor, is greater than a predetermined reference value, wherein, based on the software update request of the vehicle and a number of the other vehicles, each having completed the software update executable by the corresponding processor, the vehicle is further configured to perform the software update executable by the processor of the vehicle by directly receiving the software update from the server through communication over the wireless network with the server, wherein the number of the other vehicles, each having completed the software update executable by the corresponding processor, is less than or equal to the predetermined reference value, wherein the vehicle is further configured to perform the software update of the vehicle based on a priority while the plurality of other vehicles is driving;

wherein the vehicle is controlled based on the software update of the vehicle performed according to the priority given to each of the plurality of other vehicles based on the current remaining driving time corresponding to each of the other vehicles while the plurality of other vehicles is driving; and wherein the vehicle is controlled based on the software update of the vehicle performed according to a current remaining driving time of each of the plurality of other vehicles included in the wireless network while the plurality of other vehicles is driving.

* * * * *